No. 684,424. Patented Oct. 15, 1901.
C. A. GREEN.
SEEDING MACHINE.
(Application filed Dec. 1, 1899.)
(No Model.)
3 Sheets—Sheet 1.

Witnesses:
G. S. Noble
J. Buehler

Inventor.
Carl August Green
by B. Singer
Att'y.

No. 684,424. Patented Oct. 15, 1901.
C. A. GREEN.
SEEDING MACHINE.
(Application filed Dec. 1, 1899.)

(No Model.) 3 Sheets—Sheet 3.

Witnesses:
T. D. McMahon.
G. S. Noble.

Inventor,
Carl August Green
by B. Singer
Att'y.

UNITED STATES PATENT OFFICE.

CARL AUGUST GREEN, OF KATRINEHOLM, SWEDEN.

SEEDING-MACHINE.

SPECIFICATION forming part of Letters Patent No. 684,424, dated October 15, 1901.

Application filed December 1, 1899. Serial No. 738,851. (No model.)

*To all whom it may concern:*

Be it known that I, CARL AUGUST GREEN, foreman, a subject of the King of Sweden and Norway, and a resident of Katrineholm, in the Kingdom of Sweden, have invented new and useful Improvements in Machines for Sowing in Rows and in Width, of which the following is a specification, reference being had to the accompanying drawings.

This invention relates to improvements in machines for seeding in rows and in width.

The invention is illustrated in the accompanying drawings, in which—

Figure 1:
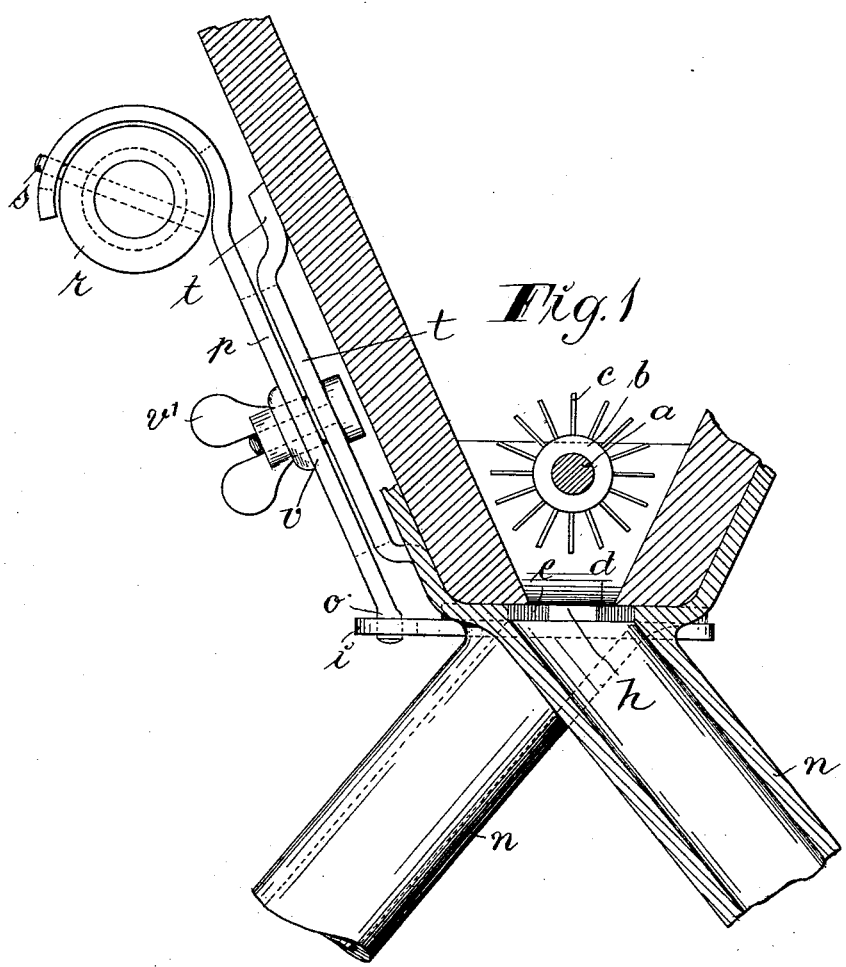
Figure 4:
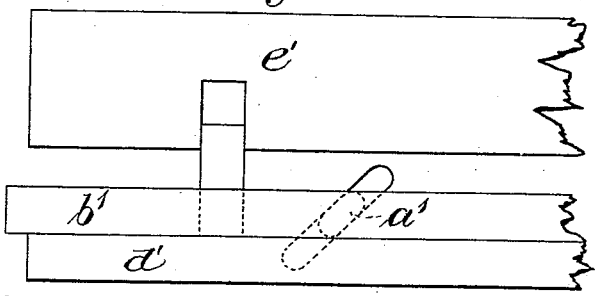
Figure 5:
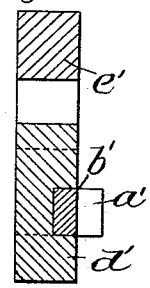
Figure 2:
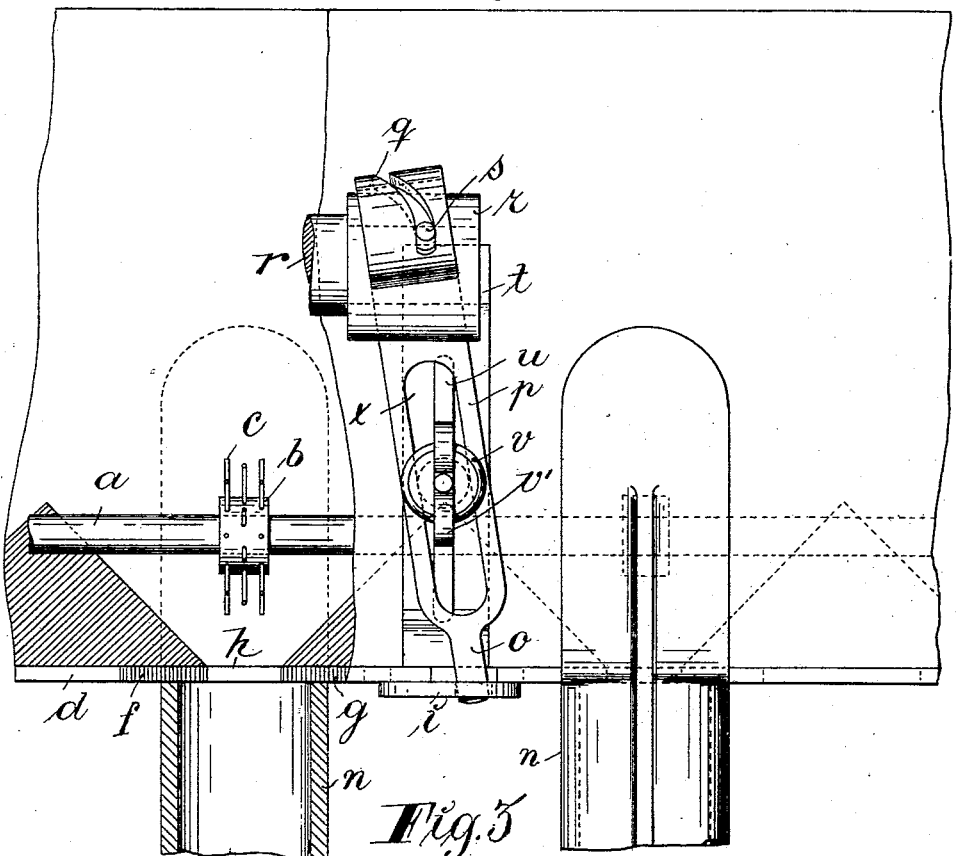
Figure 3:
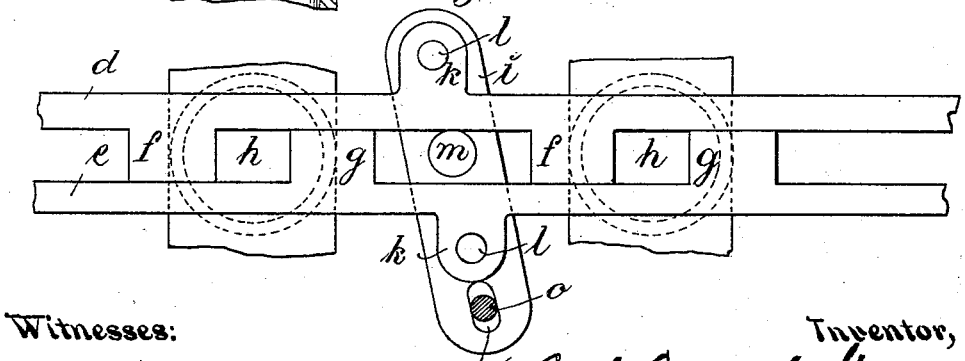
Figure 6:
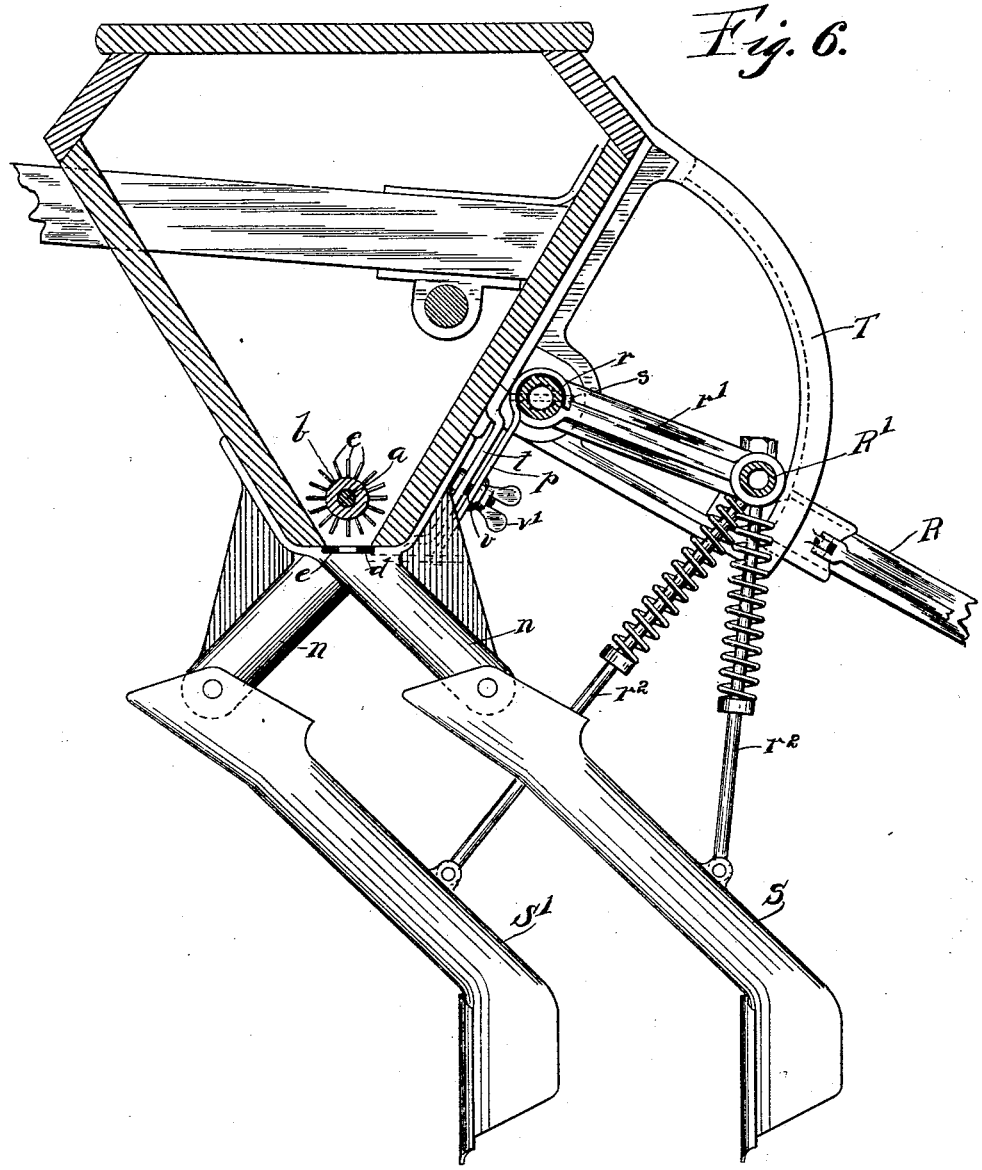

Figure 1 shows a cross-section of the seed-box; and Fig. 2, a view of the same, partly in section. Fig. 3 is a plan view of a device for regulating the size of openings at the bottom of the seedbox, through which openings the seeds descend into the shares. Figs. 4 and 5 show a modification of this latter device. Fig. 6 is a transverse section of the hopper and seed-feeders, showing also furrow-openers and certain accessory devices.

A shaft $a$, carrying rings $b$, is journaled in the bottom of the seedbox above openings $h$, which communicate with the ducts $n$, leading to the shares, said rings being on their peripheries provided with a plurality of radial pins $c$, which at the rotation of the rings transmitted from the wheels of the machine agitate and distribute the seed to the openings $h$ and cause the same to fall down to the shares. The device for regulating the size of the openings $h$, leading to the shares, consists of two bars $d$ and $e$, located side by side at the bottom of the seedbox and movable in their longitudinal direction, said bars being provided with teeth or projections $f$ and $g$, so spaced as to leave recesses of considerable longitudinal extent between the teeth of each individual bar, in which the teeth of the opposing bar play as the bars are moved in opposite directions, forming between themselves the aforesaid outlet-openings $h$. When the bars, and consequently the teeth or projections, are, by means of a special arrangement, displaced in the one direction or the other, the openings are increased or decreased, thereby regulating the quantity of seed fed to the shares.

Figs. 4 and 5 show a somewhat-modified arrangement of the regulating-bars, in which arrangement teeth or projections on one of the bars $d'$ extend into and fit in openings or recesses made in the other bar $e'$, the arrangement being such that the bars are movable toward and from one another, so that the projections are moved inward or outward in the recesses, the size of the outlet-opening being thereby increased or decreased. The two bars and the teeth of one and openings or recesses of the other, which projections and recesses, as in the former case, are situated in the same plane and in the same space of displacement, have for their purpose to produce—in the latter case by the displacement of the teeth or projections inward and outward in the openings or recesses and in the former case by the displacement of teeth or projections in the longitudinal direction of the bars—variable outlet-openings in one and the same plane.

On each of the regulating-bars $d$ and $e$ is a lug $k$, Fig. 3, which lugs are by means of pins $l$ connected to lever $i$, which can turn on a pivot $m$, so that when the lever $i$ is swung in the one direction or the other the regulating-bars are mutally displaced, the openings between the projections being thereby increased or decreased. In the arrangement shown in Figs. 4 and 5 the adjustment of the bars $d'$ and $e'$ in their relative positions can be executed, for instance, thereby. On a special bar $b'$ are oblique projections $a'$, formed at a suitable distance from one another, said projections moving in slots arranged in the seedbox obliquely to the longitudial direction of the bars and opposite the projections. The bar $b'$ is located below and moves in a longitudinal groove in one of said regulating-bars (see Fig. 5) in such a manner that the same when displaced in either direction actuates, by means of its projections, the bar provided with said groove, thereby causing this bar to move in the desired direction for adjustment. The adjustment-bar $b'$ is connected to the lifting-lever $k$ for raising the shares out of and for lowering them into the ground, so that the regulating-openings are shut or opened, in the same time as the shares are raised or lowered.

The lever $i$ is swung by means of an arrangement connected to the lifting-lever R and the shaft $r$ for raising and lowering the shares S S'. This arrangement consists of a sway-bar $p$, provided with a longitudinal slot $x$ and at its one end with a tail $o$, entering in a hole made in the lever $i$. The other end of the sway-bar $p$ forms a bow surrounding a collar or shaft $r$, which is connected to the aforesaid lifting-lever for raising and lowering the shares. The collar or shaft $r$ has a pin $s$, entering into an oblique groove or cam-slot $q$ in the bow in order to cause the arm $p$ to swing when the shaft $r$, and consequently the pin $s$, is rotated. The sway-bar $p$ is movable upon a pivot $v$, which by means of a nut $v'$ or the like can be adjusted up and down and held in any position in a vertical slot $u$, made in a plate $t$, fixed to the rear of the seed-box, thereby being moved up or down in the longitudinal slot in the sway-bar and changing the relative length of its lever-arms. By means of this the tail-pin $o$ at the lower end of the sway-bar is caused to move the lever $i$ to the right or to the left, according to the position to which the pivot $v$ is shifted, and thus adjust the normal size of the apertures $h$ according to the seed to be sowed, this adjustment being so far independent of the action produced by the rocking of the shaft $r$ when the shares are raised.

The lifting-lever R is directly attached to shaft $r$, and the latter supports, by outsetting arms $r'$ at suitable distances apart, a lifting-bar R', connected by links $r^2$ with the individual shares, so that when the lever R is raised along the locking-segment T shaft $r$ will be rocked, the shares lifted, and the feed cut off whatever the adjustment of the feed-openings $h$, and when the shares are again depressed the feed-openings will be restored to the original adjustment, due to the position of pivot $v$. Thus the adjustment of the feed is made to depend upon the sway-bar and pivot through which the opening and closing are effected, the change in relative length of the lever-arms of the sway-bar in order to effect the adjustment being proportionate to the swing necessary to effect the perfect cut-off of the feed from that adjustment as the shares are raised or restoration thereto as they are depressed.

I claim—

1. The combination with a seedbox and feed-ducts, of two parallel movable bars having projections and recesses whereby feed-apertures are formed, a series of shares with which the feed-ducts communicate, a lever for lifting and depressing said shares, and intermediate connections between said lever and said bars whereby the bars are moved to close the feed-apertures when the shares are raised and reversely moved to open said apertures when the shares are depressed.

2. The combination with a seedbox and feed-ducts, of two parallel longitudinally-movable feed-bars arranged in the throat of said seedbox and having alternate projections and recesses the latter being of greater longitudinal extent than the former to allow play to the projections when the bars are moved in opposite directions, and to form feed-apertures with said projections, a lever for imparting such opposite movement to the bars, a sway-bar whereby the lever is moved, a shaft operating said sway-bar, a lifting-bar for the shares, carried on arms from said shaft, and a lifting-lever directly attached to said shaft, whereby when the shares are raised the feed-bars are moved to close the feed-apertures, and when they are depressed are oppositely moved to reopen them.

3. The combination with the seedbox and its parallel feed-bars having projections and recesses to form feed-apertures, of the shares and their raising and lowering mechanism, connections between said raising and lowering mechanism and said feed-bars, whereby they are moved to close the feed-apertures when the shares are raised and reversely moved to open them when the shares are depressed, and means whereby said bars are moved to adjust the size of the feed-apertures and the length of stroke imparted by the action of the raising and lowering mechanism to close and open the feed-apertures simultaneously regulated to correspond with the adjustment.

4. The combination with the seed-hopper and its parallel feed-bars having projections and recesses to form feed-apertures, of a lever for moving them to change the size of said apertures, a longitudinally-slotted sway-bar having a tail $o$ at its lower end entering an opening in the free end of said lever, a pivot for said sway-bar entering the slot therein and vertically adjustable with relation thereto to move said lever and effect the adjustment of the feed-apertures, the shares and their raising and lowering mechanism, and connections between said raising and lowering mechanism and the upper end of the sway-bar, whereby said sway-bar is moved to close the feed-aperture when the shares are raised, and reversely moved to open them to their adjusted size when the shares are depressed.

5. The combination with the seedbox and its parallel feed-bars $d$ and $e$, of the lever $i$ vibratable upon a pivot fixed between said bars and movably connected with each of said bars, the longitudinally-slotted sway-bar $p$, with its tail $o$ entering a hole in the free end of said lever, the pivot $v$ vertically adjustable with respect to the slot in said sway-bar, to adjust the size of the feed-openings formed by said feed-bars, the shares, mechanism for raising and depressing the shares, and connections between said mechanism and the free arm of the sway-bar, whereby said feed-openings are closed from their point of adjustment when said shares are raised, and opened to said point of adjustment when the shares are depressed.

6. The combination with the seedbox and its parallel feed-bars with their projections and recesses for forming feed-apertures, of the lever $i$, the longitudinally-slotted sway-bar $p$, with tail $o$ at its lower end entering a hole in the free end of lever $i$, the pivot $v$ vertically adjustable with respect to the slot in said sway-bar to adjust the size of the feed-apertures formed by said feed-bars, the shares, the shaft $r$, the lifting-bar for said shares sustained by said shaft, the lifting-lever fixed to said shaft, the collar on said shaft embraced by a bow at the upper end of the sway-bar, the cam-slot $s$, and the pin $t$, whereby said sway-bar is operated whenever the shaft is rocked by the lifting-lever to raise or lower the shares.

In witness whereof I have hereunto set my hand in presence of two witnesses.

CARL AUGUST GREEN.

Witnesses:
ERNST NARDLINDH,
H. HÅKANSAN.